US008851872B2

(12) United States Patent
Murasugi et al.

(10) Patent No.: US 8,851,872 B2
(45) **Date of Patent: *Oct. 7, 2014**

(54) FORMING DIE ASSEMBLY FOR MICROCOMPONENTS

(75) Inventors: Narutoshi Murasugi, Matsudo (JP); Kazunori Maekawa, Matsudo (JP); Zenzo Ishijima, Matsudo (JP)

(73) Assignee: Hitachi Powdered Metals Co., Ltd., Matsudo (JP)

( * ) Notice: Subject to any disclaimer, the term of this patent is extended or adjusted under 35 U.S.C. 154(b) by 334 days.

This patent is subject to a terminal disclaimer.

(21) Appl. No.: 13/279,839

(22) Filed: Oct. 24, 2011

(65) Prior Publication Data

US 2012/0107445 A1 May 3, 2012

(30) Foreign Application Priority Data

Oct. 29, 2010 (JP) ................................ 2010-243150

(51) Int. Cl.

*B29C 45/72* (2006.01)
*B29C 45/02* (2006.01)
*B30B 11/02* (2006.01)
*B22F 3/03* (2006.01)

(52) U.S. Cl.

CPC .. *B30B 11/02* (2013.01); *B22F 3/03* (2013.01)
USPC ........................................................... 425/78

(58) Field of Classification Search

CPC .................................. B30B 11/02; B22F 3/03
USPC ........................................................... 425/78
See application file for complete search history.

(56) References Cited

U.S. PATENT DOCUMENTS 506,807 A * 10/1893 Beardsley .................... 425/352
2002/0022063 A1* 2/2002 Goransson ..................... 425/78
2006/0257279 A1 11/2006 Ishijima et al.

FOREIGN PATENT DOCUMENTS

JP A-2006-344581 12/2006
JP A-2011-088411 5/2011
JP A-2011-089192 5/2011

* cited by examiner

*Primary Examiner* — Robert J Grun
(74) *Attorney, Agent, or Firm* — Oliff PLC

(57) ABSTRACT

A forming die assembly for microcomponents includes a forming die, a plunger, and a punch. The forming die is formed with a cavity, a storage portion for storing a raw material with a metal powder and a binder having plasticity, and a punch hole that connects the cavity and the storage portion so as to form a gate therebetween. The plunger is formed so as to be slidably inserted into the storage portion and to fill the raw material stored in the storage portion into the cavity through the punch hole. The punch is slidably inserted into the plunger in the sliding direction of the plunger and opens and closes the gate by reciprocatory sliding. The punch closes the gate and compresses the raw material in the cavity into a green compact by sliding in the direction of the cavity.

4 Claims, 5 Drawing Sheets

10
20
20a
21
21a
22
23
30
30a
31
32
33
40
50
60
P
11
1A

FORMING DIE ASSEMBLY FOR MICROCOMPONENTS

BACKGROUND OF THE INVENTION

1. Technical Field

The present invention relates to a forming die assembly including dies that may be used for producing microcomponents such as microgears. In the dies, a raw material with a metal powder and a binder having plasticity is compacted into a green compact with a shape similar to that of the microcomponent.

2. Background Art

Recently, in the production of digital home appliances, advanced medical equipment, and IT devices, there are trends toward decreasing dimensions and increasing performances of the devices. Therefore, requirements for decreasing dimensions and wall thicknesses have been increasing for components of such devices. In view of this, although microcomponents basically have small dimensions and thin walls, the microcomponents are also required to be even smaller and have thinner walls. A production method for such microcomponents is disclosed in Japanese Patent Application of Laid-Open No. 2006-344581. In this method, a raw material with a metal powder and a binder having plasticity is filled in a die and is compressed by a punch, whereby a green compact with a shape similar to that of the target shape is formed. Then, the green compact is sintered.

According to the production method of the green compact disclosed in Japanese Patent Application of Laid-Open No. 2006-344581, the raw material is sufficiently filled at a portion of the die, which corresponds to a thin-walled portion of the target shape. Therefore, a green compact with high accuracy is obtained. In this case, since the raw material is different from a raw powder, which is used in an ordinary powder metallurgy process, and has plasticity, the raw material is difficult to use. That is, a predetermined amount of the raw material must be directly filled in the die, and this increases the steps in the process. The raw material is filled in the die at each compacting as is the case in an ordinary die forming for compacting a powder. However, in a case of forming a microcomponent, since the amount of raw material required for one compacting is extremely small, this production method is not efficient.

SUMMARY OF THE INVENTION

The present invention has been completed in view of the above circumstances, and an object of the present invention is to provide a forming die assembly for microcomponents. According to the forming die assembly, a raw material with a metal powder and a binder having plasticity (hereinafter called a "raw material") is easily supplied to dies and is thereby efficiently compacted, whereby a green compact is obtained.

The present invention provides a forming die assembly for microcomponents, and the forming die assembly includes a forming die, a plunger, and a punch. The forming die is formed with a cavity, a storage portion for storing a raw material having plasticity, and a punch hole that connects the cavity and the storage portion so as to form a gate therebetween. The plunger is formed so as to be slidably inserted into the storage portion and to fill the raw material stored in the storage portion into the cavity through the punch hole. The punch is slidably inserted into the plunger in the sliding direction of the plunger, and it opens and closes the gate by reciprocatory sliding. The punch closes the gate and compresses the raw material in the cavity into a green compact by sliding in the direction of the cavity.

According to the present invention, the raw material stored in the storage portion of the forming die is filled in the cavity by the plunger, and the raw material in the cavity is compacted into a green compact by the punch. Then, the forming die assembly is opened, whereby the green compact is obtained. By repeating the above operation, green compacts are continuously obtained. The raw material in a small amount is easily supplied to the cavity by the plunger, and the punch is not required to be pulled out, whereby the green compact is efficiently produced.

In the present invention, the forming die may be provided with an upper die and a lower die, and the upper die and the lower die may be arranged so that they can relatively vertically make contact with each other and separate from each other. In this case, the storage portion may be formed at one of the upper die and the lower die. The cavity may be formed at least one side of the upper die and the lower die when the upper die and the lower die are brought into contact with each other.

In the present invention, the green compact may have a flange portion and a shaft portion, and the shaft portion may project from the flange portion.

Moreover, in the present invention, in order to improve the flowability of the raw material and to easily fill the raw material into the cavity, the forming die is preferably provided with a heating means for heating the raw material in the storage portion.

According to the present invention, a forming die assembly for microcomponents is provided, and the raw material is easily supplied to the forming die, and thereby a green compact is efficiently obtained.

PREFERRED EMBODIMENTS OF THE INVENTION

Embodiments of the present invention will be described with reference to the figures hereinafter.

(1) Microgear

Figure 1:
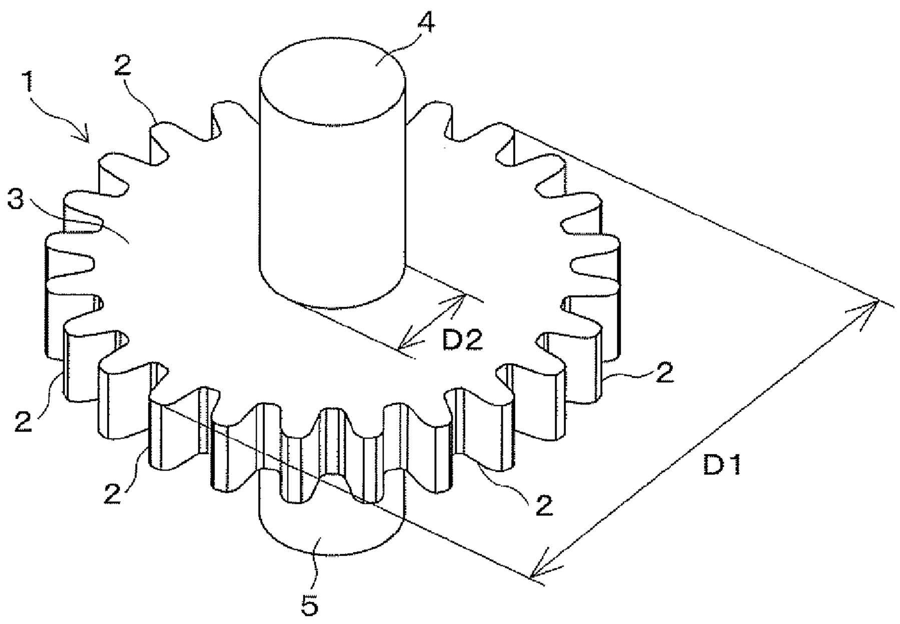
FIG. 1 is a perspective view showing a microgear obtained from a green compact that is formed by a forming die assembly of an embodiment of the present invention.

FIG. 1 shows a microgear (hereinafter called a "gear") of a microcomponent. The gear 1 is obtained by sintering a green compact that is formed by a forming die assembly of an embodiment. The gear 1 has a spur wheel portion 3 and columnar shaft portions 4 and 5 which have the same length. The spur wheel portion 3 is formed with plural teeth 2 at the outer circumferential surface thereof. Each of the shaft portions 4 and 5 perpendicularly extends on either side from the center of the spur wheel portion 3. The gear 1 may have the following dimensions. For example, the spur wheel portion 3 has an outer diameter D1 of several hundred micrometers to several millimeters, and the shaft portions 4 and 5 have a diameter D2 of several dozen to several hundred micrometers.

(2) Forming Die Assembly (2-1) Structure

FIGS. 2A to 2D and FIGS. 3A to 3D show steps for forming a green compact of the gear 1 by a forming die assembly of an embodiment. First, the structure of the forming die assembly will be described with reference to FIGS. 2A to 2D. As shown in FIGS. 2A to 2D, a reference numeral 10 denotes a forming die, and the forming die 10 is formed of an upper die 20 and a lower die 30. The upper die 20 and the lower die 30 are vertically movably provided and are arranged so that they can relatively vertically make contact with each other and separate from each other.

The upper die 20 has an inside that is formed with a storage portion 21 for storing a raw material, and the storage portion 21 extends in the vertical direction and has an opening at the upper side. The storage portion 21 has a cylindrical inner circumferential surface and has a tapered portion 21*a* at the lower end portion, and the tapered portion 21*a* has a conical shape that is downwardly tapered. The upper die 20 is also formed with an upper punch hole 22 at the inside and has a horizontal lower surface 20*a*. The upper punch hole 22 downwardly extends from the lower end of the tapered portion 21*a* and has an opening at the side of the lower surface 20*a*. The upper punch hole 22 is concentric with the storage portion 21, and the upper punch hole 22 and the storage portion 21 have a gate 23 therebetween. The upper punch hole 22 has an inner diameter that is set so as to be the same as the diameters of the shaft portions 4 and 5 of the gear 1.

The storage portion 21 is formed so as to be filled with a raw material P, which has plasticity, from the opening at the upper side, whereby the raw material P is stored. The raw material P may be a metal powder that is formed by mixing 40 to 60 volume % of a binder with a metal powder and by kneading them. The metal powder may be an iron powder, and the binder may be made of thermoplastic resin and wax.

Figures 2A, 2B, 2C, 2D:
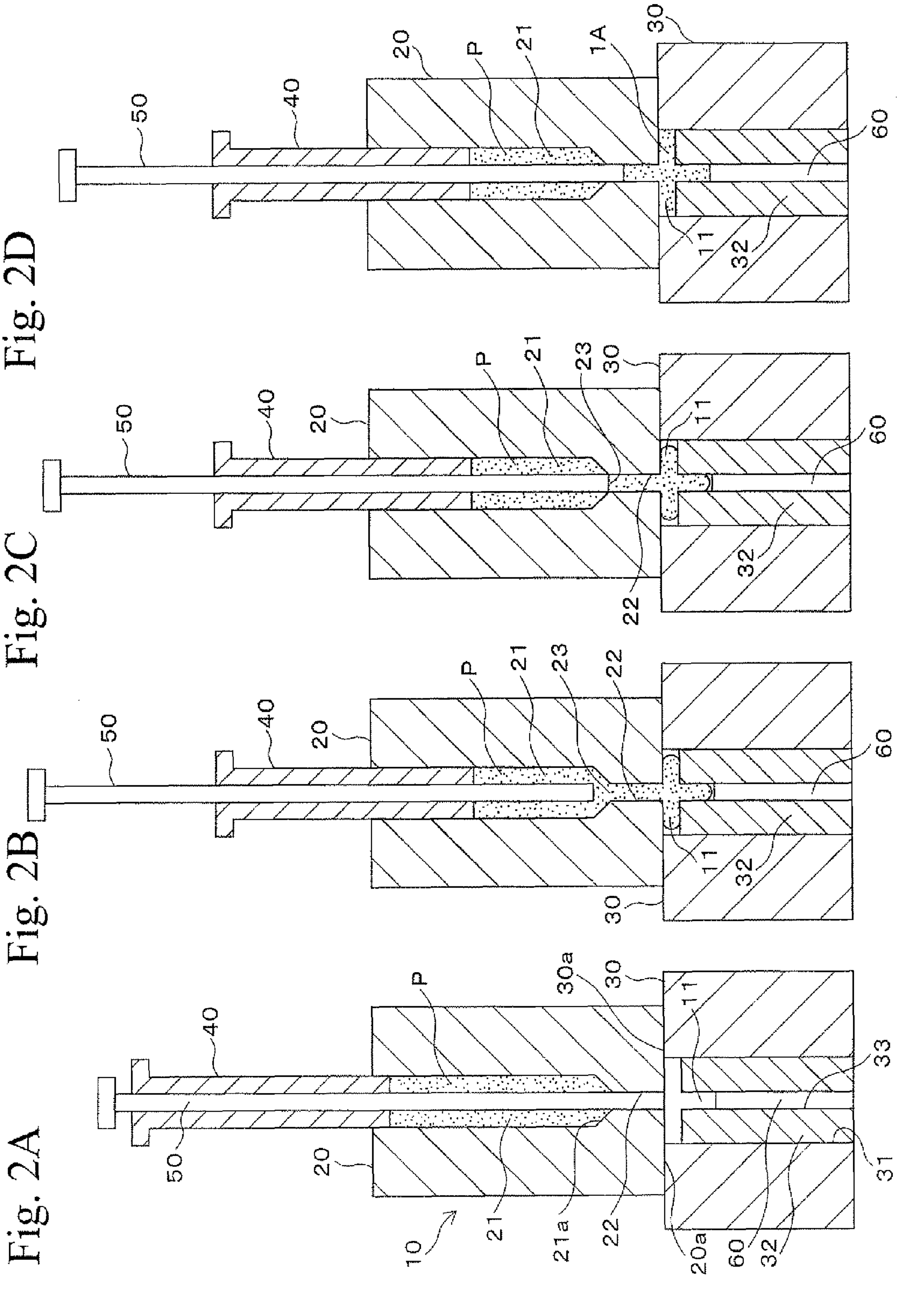
FIGS. 2A to 2D are cross sectional views showing an early part of a forming step of a green compact using a forming die assembly of an embodiment.

The storage portion 21 is formed so that a plunger 40 is slidably inserted thereinto from the opening at the upper side. The plunger 40 has a shaft center through which an upper punch 50 slidably penetrates in a vertical direction that is a sliding direction of the plunger 40. The upper punch 50 has a lower end portion, and the lower end portion is slidably inserted into the upper punch hole 22 when the upper punch 50 is lowered. In this case, the gate 23 is closed by the upper punch 50. By raising the upper punch 50 in a condition in which the gate 23 is closed, the upper punch 50 is pulled out from the upper punch hole 22, and the gate 23 is opened as shown in FIG. 2B.

Figure 4:
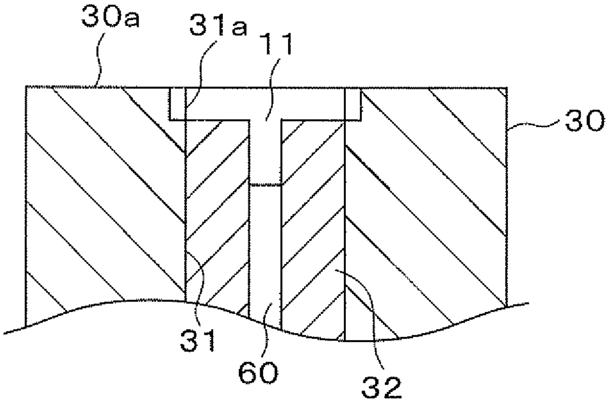
FIG. 4 is a partial cross sectional view of a lower die provided to a forming die assembly of an embodiment.

The lower die 30 has a horizontal upper surface 30*a* that can be brought into contact with the lower surface 20*a* of the upper die 20. The lower die 30 is formed with a cylindrical hole 31 that has openings at both ends. The cylindrical hole 31 is formed so that an inner die 32 is vertically slidably inserted thereinto. As shown in FIG. 4, the cylindrical hole 31 has an inner circumferential surface at the upper end portion, and the inner circumferential surface is formed with internal teeth 31*a* for forming teeth 2 of the spur wheel portion 3 of the gear 1. The inner die 32 has a center formed with a lower punch hole 33 that has an inner diameter equivalent to the diameters of the shaft portions 4 and 5 of the gear 1. The lower punch hole 33 is formed so that a lower punch 60 is slidably inserted thereinto. The inner die 32 and the lower punch 60 are coaxially arranged with the plunger 40 and the upper punch 50 at the side of the upper die 20.

(2-2) Forming Step

Next, a forming step for a green compact of the gear 1 using the forming die assembly will be described with reference to FIGS. 2A to 2D and FIGS. 3A to 3D. First, the lower surface 20*a* of the upper die 20 and the upper surface 30*a* of the lower die 30 are brought into contact and are clamped. Then, the upper punch 50 is inserted into the upper die 20 so that the lower end of the upper punch 50 is at the same level as the lower surface 20*a*, whereby the gate 23 is closed. Next, the raw material P is supplied to the storage portion 21 until the storage portion 21 is almost filled, and the leading end of the plunger 40 is inserted into the storage portion 21. On the other hand, the inner die 32 is positioned lower than the lower die 30 so as to expose the internal teeth 31*a* at the upper end portion of the cylindrical hole 31. Moreover, the lower punch 60 is lowered more than the inner die 32 so as to form a cavity 11 which corresponds to the spur wheel portion 3 and the shaft portion 5 at the lower side of the gear 1 (FIG. 2A).

Next, the upper punch 50 is raised and is pulled out from the upper punch hole 22, whereby the gate 23 is opened. Thus, the cavity 11 and the storage portion 21 are connected via the upper punch hole 22. The upper punch hole 22 functions as a part of the cavity 11. In this condition, the plunger 40 is pressed down, whereby a necessary amount of the raw material P is filled from the gate 23 to the cavity 11 with a cruciform section including the upper punch hole 22 (FIG. 2B).

Then, the upper punch 50 is pressed down so as to close the gate 23, and the upper punch 50 is further pressed down so as to compact the raw material P in the cavity 11 (FIGS. 2C and 2D). Thus, the spur wheel portion 3 and the shaft portion 5 at the lower side of the gear 1 are formed at the side of the lower die 30 of the cavity 11, and the shaft portion 4 at the upper side of the gear 1 is formed at the side of the upper die 20 of the cavity 11 (at a part of the upper punch hole 22). Accordingly, a green compact 1A of a gear 1 is formed.

Figures 3A, 3B, 3C, 3D:
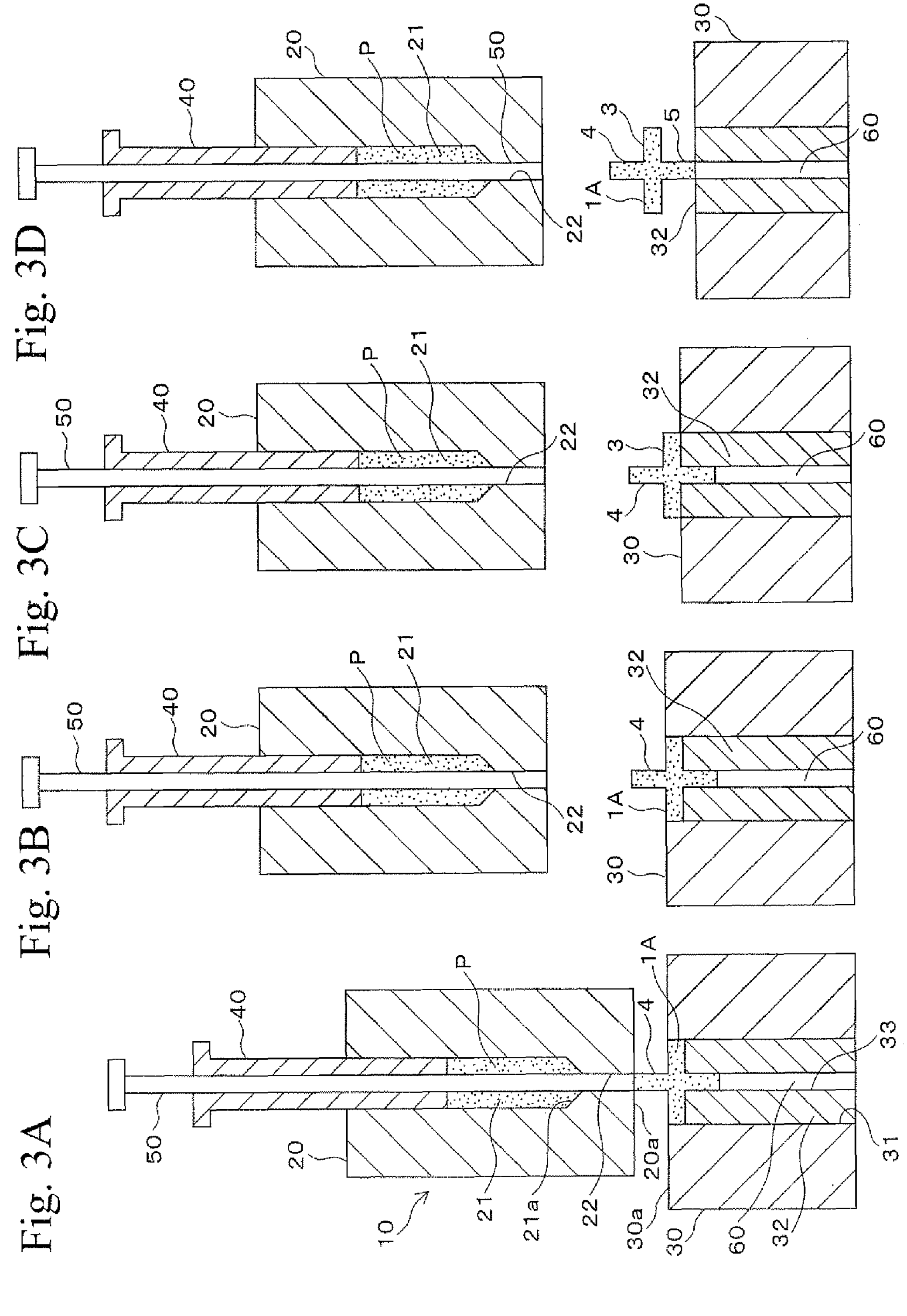
FIGS. 3A to 3D are cross sectional views showing the rest of the forming step.

After the green compact 1A is formed in the forming die 10 as described above, the forming die 10 is opened so as to pull out the green compact 1A. In this case, the upper die 20 is raised so as that the lower surface 20*a* is at the same level as the lower end surface of the upper punch 50, whereby the shaft portion 4 at the upper side of the gear 1 is exposed (FIG. 3A). Then, the entire of the structural components at the side of the upper die 20 is raised (FIG. 3B). Next, the lower die 30 is lowered so as to expose the spur wheel portion 3 (FIG. 3C). Moreover, the lower die 30 and the inner die 32 are further lowered and the lower punch 60 is raised, whereby the shaft portion 5 at the lower side of the gear 1 is upwardly pulled out from the lower punch hole 33 (FIG. 3D). Thus, the green compact 1A is removed from the forming die assembly for subsequent steps.

The side of the upper die 20 is lowered as it is. In the side of the lower die 30, the lower die 30 is raised so as to be brought into contact with the upper die 20, and the inner die 32 and the lower punch 60 are lowered so as to form the cavity 11. Accordingly, the condition shown in FIG. 2A is obtained again. By repeating the above operation, a green compact 1A is formed. Such forming operation of the green compact 1A is repeated until the raw material P in the storage portion 21 is used up.

(2-3) Effects

According to the forming die assembly of the above embodiment, the upper punch 50 is raised so as to open the gate 23, and the raw material P stored in the storage portion 21 in the forming die 10 is filled in the cavity 11 by the plunger 40. Next, the upper punch 50 is pressed down so as to close the gate 23, and the raw material P in the cavity 11 is subsequently compacted by the upper punch 50. Then, the forming die assembly is opened, whereby a green compact 1A is obtained. By repeating this operation, green compacts 1A are successively obtained. A small amount of the raw material P is easily filled in the cavity 11 by pressing down the plunger 40 without pulling out the upper punch 50. Accordingly, even when the amount of the raw material P is small in one forming, the green compact 1A is efficiently produced.

(3) Another Example of the Forming Step

Figures 5A, 5B, 5C, 5D:
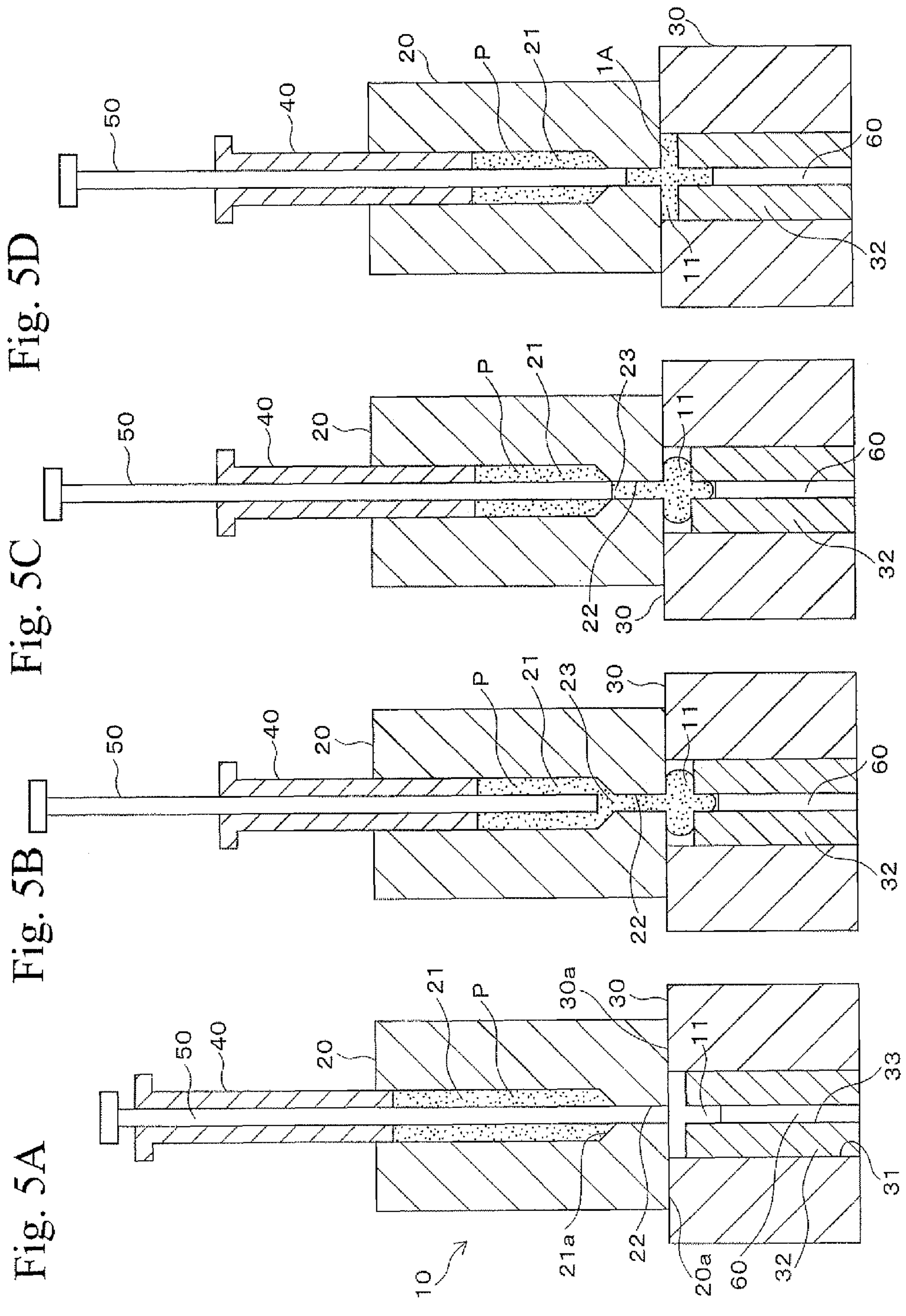
FIGS. 5A to 5D are cross sectional views showing another example of an early part of a forming step of an embodiment.

FIGS. 5A to 5D show another example of the early part of the forming step shown in FIGS. 2A to 2D in the above embodiment. In this case, as shown in FIG. 5B, the cavity 11 at the side of the lower die 30 is formed by lowering the inner die 32 more than that in the case shown in FIG. 2B. Therefore, a portion for forming the spur wheel portion 3 has a large thickness. The portion for forming the spur wheel portion 3 is axially directly compacted by raising the inner die 32 in the compacting as shown in FIG. 5D. Then, an operation similar to that shown in FIG. 3A to 3D is performed, whereby a green compact 1A is obtained. In addition, the inner die 32 may be divided into an internal portion and an external portion. In this case, a smaller diameter gear is formed under the spur wheel portion 3, whereby a two-step gear is formed.

(4) Variations of the Present Invention

In the above embodiments, the gear 1 is formed as a microcomponent, which has the shaft portions 4 and 5 at both sides of the spur wheel portion 3. In addition to the microcomponent having the shaft portions at both sides of the spur wheel portion 3, a microcomponent having the shaft portion at one side of the spur wheel portion 3 may be formed. Alternately, a microcomponent having only the spur wheel portion 3 may be formed. On the other hand, a microcomponent may be formed so as to have shaft portions at both sides of a simple disc-shaped flange portion instead of the spur wheel portion 3. In this case, a microcomponent may be formed so as to have a shaft portion at one side of the flange portion. Moreover, a microcomponent in a simple disc shape may be formed.

Furthermore, the upper die 20 having the storage portion 21 is preferably provided with a heating means for heating the raw material P in the storage portion 21. By heating the raw material P with this heating means, the flowability of the raw material P is increased, and filling of the raw material P into the cavity is smoothly and sufficiently performed. In this case, the heating temperature is set to be approximately the softening point of the thermoplastic resin added to the binder of the raw material P. It should be noted that the heating means may be provided at both the upper die 20 and at the lower die 30 to heat the cavity.

What is claimed is:

1. A forming die assembly for microcomponents, comprising:

a forming die formed with a cavity, a storage portion for storing a raw material with a metal powder and a binder having plasticity, and a punch hole that connects the cavity and the storage portion so as to form a gate therebetween;

a plunger formed so as to be slidably inserted into the storage portion and to fill the raw material stored in the storage portion into the cavity through the punch hole; and a punch slidably inserted into the plunger in the sliding direction of the plunger and opening and closing the gate by reciprocatory sliding, the punch closing the gate and compressing the raw material in the cavity into a green compact by sliding in the direction of the cavity.

2. The forming die assembly for microcomponents according to claim 1, wherein the forming die is provided having an upper die and a lower die which are arranged so that they can relatively vertically make contact with each other and separate from each other, the storage portion is formed at one of the upper die and the lower die, and the cavity is formed at least one side of the upper die and the lower die when the upper die and the lower die are brought into contact with each other.

3. The forming die assembly for microcomponents according to claim 1, wherein the green compact has a flange portion and a shaft portion, and the shaft portion projects from the flange portion.

4. The forming die assembly for microcomponents according to claim 1, wherein the forming die is provided with a heating means for heating the raw material in the storage portion.

* * * * *